(12) United States Patent
Takahashi

(10) Patent No.: US 10,523,869 B2
(45) Date of Patent: Dec. 31, 2019

(54) IMAGING APPARATUS AND CONTROL METHOD THEREOF

(71) Applicant: FUJIFILM Corporation, Tokyo (JP)

(72) Inventor: Kosuke Takahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 56 days.

(21) Appl. No.: 15/982,345

(22) Filed: May 17, 2018

(65) Prior Publication Data
US 2018/0270423 A1 Sep. 20, 2018

Related U.S. Application Data

(63) Continuation of application No. PCT/JP2016/083782, filed on Nov. 15, 2016.

(30) Foreign Application Priority Data

Nov. 18, 2015 (JP) .................................. 2015-225962

(51) Int. Cl.
*H04N 5/232* (2006.01)
*H04N 5/225* (2006.01)
(52) U.S. Cl.
CPC ..... *H04N 5/23267* (2013.01); *H04N 5/22525* (2018.08); *H04N 5/2327* (2013.01); *H04N 5/23287* (2013.01); *H04N 5/23293* (2013.01)
(58) Field of Classification Search
CPC ........... H04N 5/23267; H04N 5/23293; H04N 5/23287; H04N 5/2327; H04N 5/232945;
(Continued)

(56) References Cited

U.S. PATENT DOCUMENTS 5,237,365 A * 8/1993 Miyazawa ............. G03B 7/093
348/E5.037
5,576,788 A * 11/1996 Miyazawa ............. G03B 17/18
396/263
(Continued)

FOREIGN PATENT DOCUMENTS

CN 101547315 A 9/2009
CN 102239686 A 11/2011
(Continued)

OTHER PUBLICATIONS

Chinese Office Action and English translation of the Chinese Search Report dated Nov. 20, 2018, for corresponding Chinese Application No. 201680067532.4.
(Continued)

*Primary Examiner* — Hung H Lam
(74) *Attorney, Agent, or Firm* — Birch, Stewart, Kolasch & Birch, LLP

(57) ABSTRACT

A camera shake detection unit detects a camera shake value. A shutter button that is a shutter operating unit is operated in imaging. A prediction range calculation unit calculates a prediction range of a camera shake value that occurs in a case where the shutter button is operated, on the basis of a history of the camera shake value after a previous operation of the shutter button. A camera shake display controller displays a locus of camera shake on an EVFLCD on the basis of the camera shake value detected by the camera shake detection unit before the operation of the shutter button, and displays the prediction range on the EVFLCD using a leading end of the locus as a starting point.

13 Claims, 16 Drawing Sheets

(58) Field of Classification Search
CPC ........... H04N 5/22525; H04N 5/23258; H04N 5/23245; G03B 17/18; G03B 5/00; G03B 2205/0007
See application file for complete search history.

(56) References Cited

U.S. PATENT DOCUMENTS

| | | | | |
|---|---|---|---|---|
| 5,937,214 | A * | 8/1999 | Shintani | G03B 17/00 348/E5.046 |
| 2003/0053803 | A1 * | 3/2003 | Washisu | G03B 17/00 396/55 |
| 2010/0302410 | A1 * | 12/2010 | Naito | G03B 5/00 348/231.99 |
| 2011/0234826 | A1 | 9/2011 | Nguyen et al. | |
| 2012/0026378 | A1 * | 2/2012 | Pang | H04N 5/23251 348/333.02 |
| 2014/0168448 | A1 | 6/2014 | Ozawa | |

FOREIGN PATENT DOCUMENTS

| | | | |
|---|---|---|---|
| JP | 2-126253 | A | 5/1990 |
| JP | 8-262517 | A | 10/1996 |
| JP | 11-149103 | A | 6/1999 |
| JP | 2001-169149 | A | 6/2001 |
| JP | 2002-196384 | A | 7/2002 |
| JP | 2008-148049 | A | 6/2008 |
| JP | 2010 68141 | A | 3/2010 |
| JP | 2010-74858 | A | 4/2010 |
| WO | WO 2011/043024 | A1 | 4/2011 |
| WO | WO 2014/172151 | A1 | 10/2014 |

OTHER PUBLICATIONS

International Preliminary Report on Patentability and Written Opinion of the International Searching Authority (forms PCT/IB/373, PCT/ISA/237 and PCT/IB/326), dated May 31, 2018, for International Application No. PCT/JP2016/083782, with an English translation of the Written Opinion.

International Search Report (form PCT/ISA/210), dated Feb. 21, 2017, for International Application No. PCT/JP2016/083782, with an English translation.

* cited by examiner

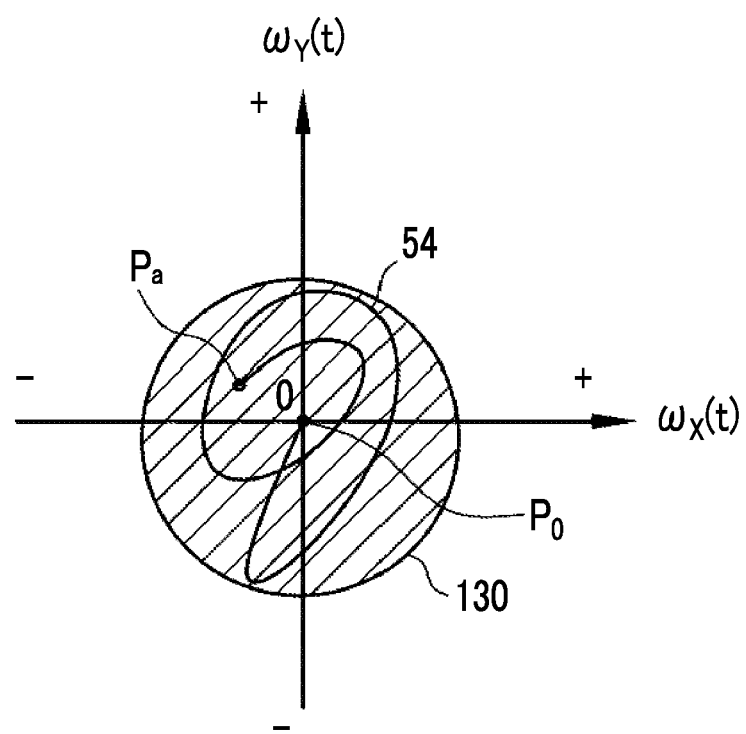

IMAGING APPARATUS AND CONTROL METHOD THEREOF

CROSS-REFERENCE TO RELATED APPLICATIONS

This application is a Continuation of PCT International Application No. PCT/JP2016/083782 filed on 15 Nov. 2016, which claims priority under 35 U.S.C § 119(a) to Japanese Patent Application No. 2015-225962 filed on 18 Nov. 2015. The above application is hereby expressly incorporated by reference, in its entirety, into the present application.

BACKGROUND OF THE INVENTION

1. Field of the Invention

The present invention relates to an imaging apparatus having a camera shake detection function and a control method thereof.

2. Description of the Related Art

In recent years, an imaging apparatus such as a digital camera generally has a camera shake correction function for detecting camera shake values that occur in imaging and correcting image shake on the basis of the detected camera shake values. As such a digital camera, there is a digital camera in which an indicator indicating camera shake values is displayed on a display unit in order to enable a user to confirm the state of camera shake.

For example, JP1990-126253A (JP-H02-126253A) has proposed a technique for two-dimensionally displaying camera shake values together with a camera shake allowable range. The camera shake allowable range is set in accordance with an imaging condition such as an exposure time or camera shake correction performance. A user may execute imaging while confirming the state of camera shake.

Further, JP2001-169149A discloses a technique for predicting camera shake values in a shutter operation from camera shake values that currently occur before a shutter operation is performed to prevent image shake in the shutter operation.

SUMMARY OF THE INVENTION

However, it is usual that camera shake values in framing before a shutter operation and camera shake values that occur in a shutter operation are quite different from each other. Specifically, the camera shake values that occur in the shutter operation are larger than the camera shake values in framing, and have nothing to do with the camera shake values in framing. Accordingly, JP2001-169149A shows a method for predicting the camera shake values in the shutter operation from the camera shake values in framing, but since this prediction method is a method for predicting the camera shake values in the shutter operation on the basis of the camera shake values before the shutter operation, it is difficult to accurately predict the camera shake values in the shutter operation.

An object of the invention is to provide an imaging apparatus and a control method thereof capable of accurately predicting and displaying camera shake values that occur in a case where a shutter operating unit is operated.

In order to achieve the above object, according to an aspect of the invention, there is provided an imaging apparatus comprising: a camera shake detection unit; a shutter operating unit; an image display unit; a prediction range calculation unit; and a camera shake display controller. The camera shake detection unit detects a camera shake value. The shutter operating unit is operated in imaging. The image display unit is a unit on which an image is displayed. The prediction range calculation unit calculates a prediction range of a camera shake value that occurs in a case where the shutter operating unit is operated, on the basis of a history of the camera shake value after a previous operation of the shutter operating unit. The camera shake display controller displays a locus of camera shake on the image display unit on the basis of the camera shake value detected by the camera shake detection unit before the operation of the shutter operating unit and displays the prediction range on the image display unit using a leading end of the locus as a starting point.

It is preferable that the camera shake detection unit detects the camera shake values that occur in an in-plane direction orthogonal to an optical axis of an imaging lens.

It is preferable that the imaging apparatus further comprises: an imaging element that generates an image on the basis of an optical image that is incident through the imaging lens; and an exposure time setting unit that sets an exposure time of the imaging element, in which the prediction range calculation unit calculates a prediction range of a camera shake value in the in-plane direction that occurs in the exposure time set by the exposure time setting unit after the shutter operating unit is operated, on the basis of the history of the camera shake value.

It is preferable that the prediction range calculation unit calculates the prediction range as a range including the locus in the exposure time set by the exposure time setting unit on the basis of the history of the camera shake value.

It is preferable that the camera shake display controller displays an allowable range of the camera shake value on the basis of an imaging condition including the exposure time.

It is preferable that the imaging apparatus further comprises: a shake reduction controller that moves the imaging lens or the imaging element on the basis of the camera shake value detected by the camera shake detection unit to reduce shake of the image due to camera shake; and a switch unit that switches a shake reducing operation of the shake reduction controller between turning on and off.

It is preferable that the camera shake display controller displays the allowable range on the basis of a setting state of the shake reducing operation through the switch unit, in addition to the imaging condition.

It is preferable that the camera shake display controller sequentially eliminates portions of the locus after a predetermined time elapses.

It is preferable that the imaging apparatus further comprises: a camera shake prediction value calculation unit that calculates a camera shake prediction value indicating a camera shake value after a predetermined time elapses from the locus by computation, in which the camera shake display controller displays the prediction range using the camera shake prediction value calculated by the camera shake prediction value calculation unit as a starting point.

It is preferable that a history acquisition mode for acquiring the history of the camera shake values is provided. Here, it is preferable that the shutter operating unit is operable a predetermined number of times in the history acquisition mode and the camera shake display controller calculates the prediction range on the basis of the camera shake value after the predetermined number of operations of the shutter operating unit, and displays the calculated prediction range on the image display unit.

It is preferable that the imaging apparatus further comprises: a finder unit configured to observe an optical image, in which the image display unit displays the locus in the finder unit, and displays the prediction range.

It is preferable that the image display unit is a rear surface display unit.

According to another aspect of the invention, there is provided a control method of an imaging apparatus including a camera shake detection unit that detects a camera shake value, a shutter operating unit that is operated in imaging, and an image display unit on which an image is displayed, the method comprising: a prediction range calculation step; and a camera shake display control step. In the prediction range calculation step, a prediction range of a camera shake value that occurs in a case where the shutter operating unit is operated is calculated, on the basis of a history of the camera shake value after a previous operation of the shutter operating unit. In the camera shake display control step, a locus of camera shake is displayed on the image display unit on the basis of the camera shake value detected by the camera shake detection unit before the operation of the shutter operating unit and the prediction range is displayed on the image display unit using a leading end of the locus as a starting point.

According to the imaging apparatus and the control method thereof of the invention, since a locus of camera shake that occurs before an operation of a shutter operating unit is displayed and a prediction range of a camera shake value that occurs in a case where the shutter operating unit is operated is displayed at a leading end of the locus, it is possible to accurately predict and display the camera shake value that occurs in a case where the shutter operating unit is operated.

BRIEF DESCRIPTION OF THE DRAWINGS

FIG. 19 is a diagram showing a modification example of a prediction range.

DESCRIPTION OF THE PREFERRED EMBODIMENTS

First Embodiment

Figure 1:
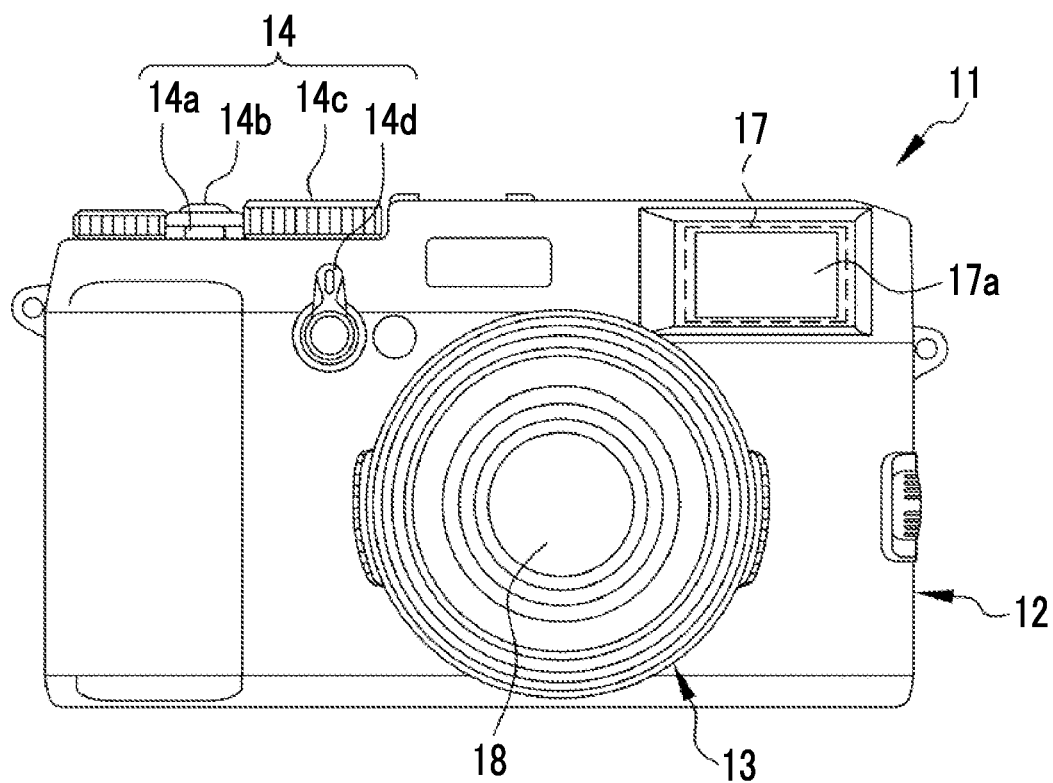
FIG. 1 is a front view of a digital camera.
Figure 2:
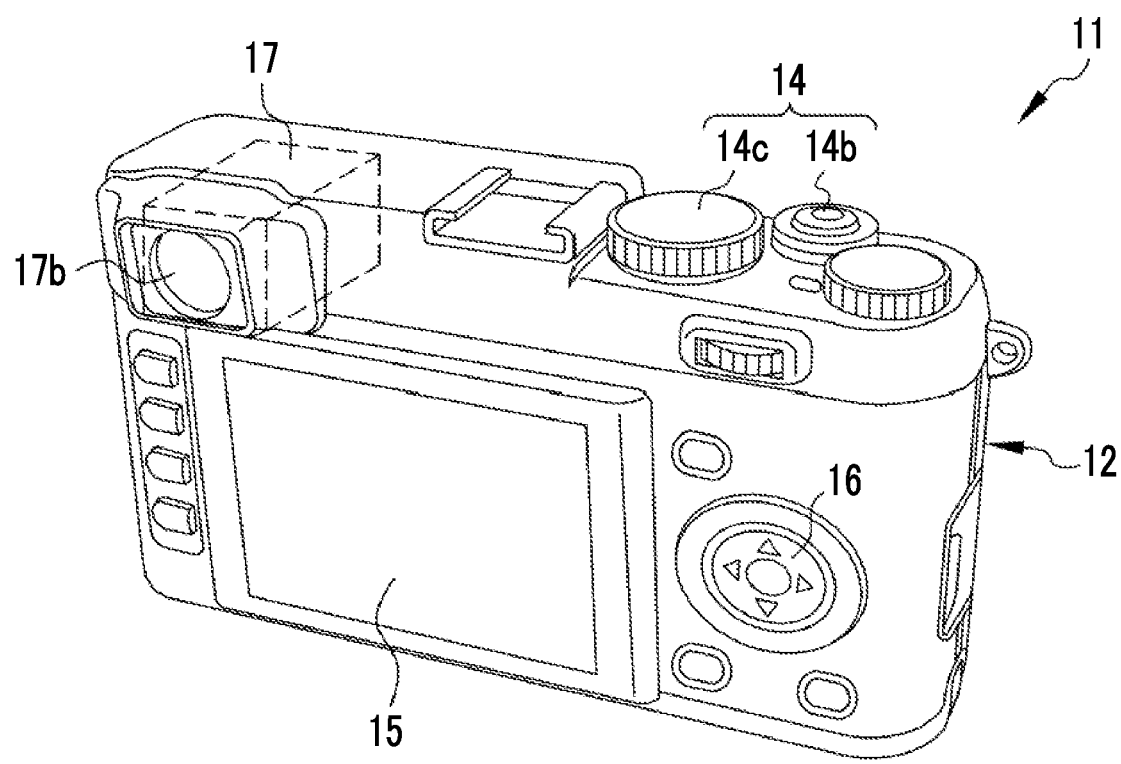
FIG. 2 is a rear side perspective view of the digital camera.

In FIGS. 1 and 2, a digital camera 11 that is an imaging apparatus includes a camera body 12, a lens barrel 13, an upper surface operating unit 14, a rear surface display unit 15, a rear surface operating unit 16, and a finder device 17 that is a finder unit. The lens barrel 13 is provided on a front surface of the camera body 12, and holds an imaging lens 18.

The finder device 17 is able to perform mode switching between an optical viewfinder (OVF) mode (hereinafter, referred to as an OVF mode) and an electronic viewfinder (EVF) mode (hereinafter, referred to as an EVF mode).

In the OVF mode, an OVF image in which an optical image of a subject, an imaging information image indicating imaging information such as an imaging condition, and a camera shake information image indicating information on camera shake overlap each other is observable. In the EVF mode, a captured image obtained by capturing an optical image and the imaging information image are observable.

Further, in the digital camera 11 of this embodiment, a history acquisition mode in which a history of camera shake values that occur in a shutter operation is acquired in advance before imaging is provided. The history acquisition mode is executed by a main controller (controller) 22 (which will be described later) on the basis of an operation of the upper surface operating unit 14.

The upper surface operating unit 14 is provided on an upper surface of the camera body 12 and includes a power button 14a, a shutter button 14b that is a shutter operating unit, a mode switch dial 14c, a finder switch lever 14d, and the like. The power button 14a is operated in turning on or off a power source (not shown) of the digital camera 11. The shutter button 14b is operated in imaging. The mode switch dial 14c is operated in switching an operation mode among an imaging mode, an image playback mode, a setting mode, and the like. The finder switch lever 14d is operated in switching a mode of the finder device 17 between the OVF mode and the EVF mode.

The imaging mode includes a static image capturing mode for acquiring a static image and a motion picture capturing mode for acquiring a motion picture. In the image playback mode, an image acquired in the static image capturing mode or the motion picture capturing mode is reproduced and displayed on the rear surface display unit 15 or an EVFLCD 36 (see FIG. 3) in the finder device 17.

The shutter button 14b has a two-stage stroke type switch (not shown) configured by a switch S1 and a switch S2, and is used in a shutter operation. The digital camera 11 performs an imaging preparation operation such as an auto-focus (AF) operation in a case where the shutter button 14b is pressed (halfway pressed) and the switch S1 is turned on. In a case where the shutter button 14b is pressed (fully pressed) from this state and the switch S2 is turned on, the digital camera 11 performs an imaging operation.

The rear surface display unit 15 is provided on a rear surface of the camera body 12, and displays a captured image acquired in a variety of imaging modes, a menu screen for performing various settings, or the like.

The rear surface operating unit 16 is provided on the rear surface of the camera body 12. The rear surface operating unit 16 is used in various setting operations. The mode switch dial 14*c* and the rear surface operating unit 16 are used in a setting operation of the above-mentioned history acquisition mode.

The finder device 17 has a finder window 17*a* that imports an optical image of a subject and a finder eyepiece unit 17*b* for the eyes of a user. The finder window 17*a* is provided on a front surface side of the camera body 12. The finder eyepiece unit 17*b* is provided on a rear surface side of the camera body 12.

Further, in a lower portion of the camera body 12, a slot (not shown) for mounting of a recording medium 34 (which will be described later) (see FIG. 3) is provided.

Figure 3:
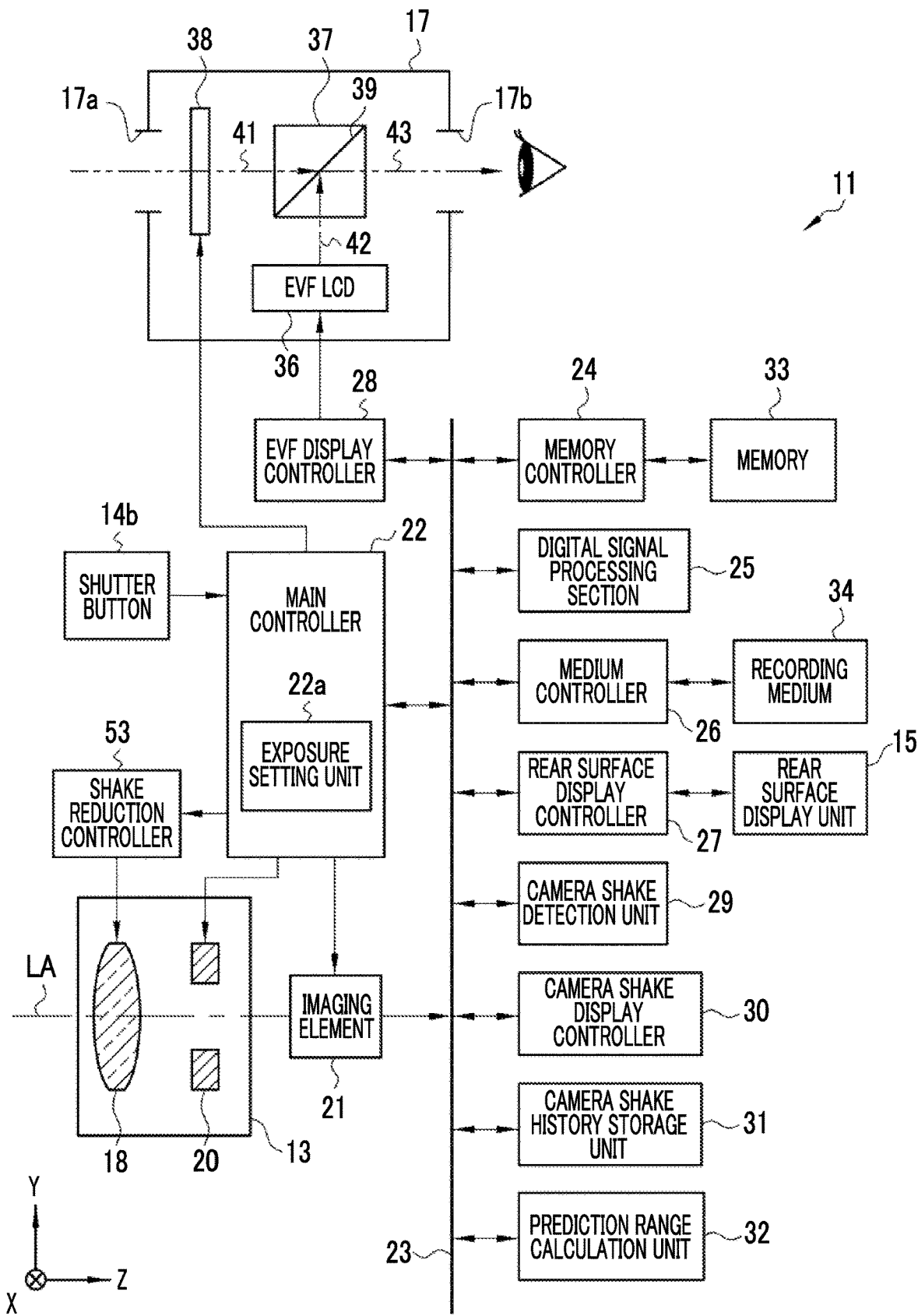
FIG. 3 is a block diagram showing an electric configuration of the digital camera.

In FIG. 3, in the lens barrel 13, a stop 20 is provided along a optical axis LA of the imaging lens 18. The stop 20 is drive-controlled by the main controller 22, and adjusts the intensity of light to be incident on an imaging element 21 (which will be described later).

The main controller 22 has a read-only memory (ROM) in which a program is stored and a random access memory (RAM) for temporarily storing data. The main controller 22 reads out the program from the ROM to the RAM, and controls operations of the respective units in the digital camera 11 on the basis of the read-out program.

The imaging lens 18 includes a zoom lens and a focus lens. The imaging lens 18 is connected to a lens drive unit (not shown), and moves the zoom lens and the focus lens in a optical axis direction under the control of the main controller 22. Zooming is performed by driving the zoom lens, and an AF operation is performed by driving the focus lens. An optical image of a subject of which the intensity of light that passes through the imaging lens 18 is adjusted by the stop 20 is incident onto the imaging element 21.

The imaging element 21 is a complementary metal oxide semiconductor (CMOS) type image sensor of a single-plate color imaging method having RGB color filters, for example.

The imaging element 21 has a light receiving surface configured of a plurality of pixels (not shown) arranged in a two-dimensional matrix form. Each pixel includes a photoelectric conversion element, and captures an optical image formed on the light receiving surface through photoelectric conversion to generate an imaging signal. Further, the imaging element 21 has an electronic shutter function, in which an exposure time (shutter speed) is set using an exposure setting unit 22*a* (which will be described later).

The imaging element 21 includes signal processing circuits. As the signal processing circuits, a noise rejection circuit, an auto gain controller, an analog/digital (A/D) conversion circuit, and the like are provided (all of them are not shown). The noise rejection circuit performs a noise rejection process with respect to an imaging signal. The auto gain controller amplifies the level of the imaging signal to an optimal value. The A/D conversion circuit converts the imaging signal into a digital signal, and outputs the digital signal from the imaging element 21. The output signal from the imaging element 21 is image data (so-called raw data) of an RGB format having one color signal for each pixel.

The imaging element 21 and the main controller 22 are connected to a bus 23. In addition, a memory controller 24, a digital signal processing section 25, a medium controller 26, a rear surface display controller 27, an EVF display controller 28, a camera shake detection unit 29, a camera shake display controller 30, a camera shake history storage unit 31, and a prediction range calculation unit 32 are connected to the bus 23.

A memory 33 for temporary storage such as a synchronous dynamic random access memory (SDRAM) is connected to the memory controller 24. The memory controller 24 inputs the image data of the RGB format output from the imaging element 21 to the memory 33 for storage. Further, the memory controller 24 outputs the image data of the RGB format stored in the memory 33 to the digital signal processing section 25.

The digital signal processing section 25 performs a defect correction process, a demosaicing process, a gamma-correction process, an RGB gain correction process, a YC conversion process, or the like with respect to the image data of the RGB format input from the memory controller 24, and generates image data (YC image data) of an YC format formed by a brightness signal Y and a color difference signal C. The digital signal processing section 25 outputs the generated image data of the YC format to the memory controller 24 to be stored in the memory 33.

Further, the digital signal processing section 25 performs a compression process based on a variety of imaging modes with respect to the YC image data to generate an image file. Specifically, in the case of the static image capturing mode, the digital signal processing section 25 compresses the YC image data according to Joint Photographic Experts Group (JPEG) standards to generate compressed image data. In the case of the motion picture capturing mode, the digital signal processing section 25 compresses a plurality of frames of YC image data obtained by motion picture imaging according to Moving Picture Experts Group (MPEG)-4 standards to generate compressed motion picture data. The digital signal processing section 25 outputs the generated image file to the medium controller 26.

The main controller 22 has the exposure setting unit 22*a*, and is able to set an exposure time of the imaging element 21. Specifically, the exposure setting unit 22*a* stores a program chart, and calculates an F number and an exposure time to be used in imaging using the program chart. More specifically, the exposure setting unit 22*a* calculates a photometric value on the basis of a brightness signal Y generated by the digital signal processing section 25. The exposure setting unit 22*a* performs a predetermined computation on the basis of the calculated photometric value to calculate an appropriate exposure value, and determines an F number and an exposure time using the program chart. The exposure setting unit 22*a* inputs the determined F number and exposure time to the main controller 22 to be respectively set for the stop 20 and the imaging element 21. In this way, the exposure setting unit 22*a* has a function of an exposure time setting unit.

The medium controller 26 controls recording and reading-out of an image file with respect to the recording medium 34. The recording medium 34 is a memory card in which a flash memory or the like is built. In the case of the static image capturing mode, compressed image data generated by the digital signal processing section 25 is recorded on the recording medium 34. Further, in the motion picture capturing mode, motion picture data generated by the digital signal processing section 25 is recorded on the recording medium 34. In the case of the motion picture capturing mode, sound in addition to an image is acquired and recorded, but in this embodiment, a configuration relating to sound acquisition and recording will not be described.

The rear surface display controller 27 controls an image display on the rear surface display unit 15. Specifically, the rear surface display controller 27 generates a video signal according to National Television System Committee (NTSC) standards or the like on the basis of YC image data generated by the digital signal processing section 25, and outputs the video signal to the rear surface display unit 15.

The EVF display controller 28 generates a video signal on the basis of the YC image data in a similar way to the rear surface display controller 27, and outputs the video signal to an EVFLCD 36 (which will be described later).

In the finder device 17, the EVFLCD 36 that is an image display unit, a prism 37, and an OVF shutter 38 are provided.

The EVFLCD 36 displays various images acquired in various imaging modes. An image display area (not shown) in which a captured image obtained by capturing an optical image of a subject using the imaging element 21 is displayed and an information display area (not shown) in which an imaging information image and a camera shake information image are displayed are set in the EVFLCD 36. The information display area is set in a lower portion of the image display area. In the information display area, the camera shake information image is displayed in a lower right portion of a screen, and the imaging information image is displayed on a left side of the camera shake information image.

The captured image refers to a display image of YC image data generated by the digital signal processing section 25. The imaging information image is generated on the basis of imaging information such as imaging conditions by the main controller 22. The camera shake information image is generated on camera shake values by the camera shake display controller 30 (which will be described later). The imaging conditions include a shutter speed, a F number, an ISO sensitivity, and the like. The imaging conditions may be set by an operation of the upper surface operating unit 14 (which will be described later).

In FIG. 3, the prism 37 is configured so that a half mirror 39 is provided therein. The half mirror 39 is disposed to form an angle of 45° with respect to a first optical path 41 on which an optical image of a subject that is incident onto the finder window 17a is to propagate and a second optical path 42 on which a display image displayed on the EVFLCD 36 is to propagate. In the half mirror 39, the first optical path 41 and the second optical path 42 are integrated to form a third optical path 43. The finder eyepiece unit 17b is disposed on the third optical path 43.

The half mirror 39 partially transmits the optical image that propagates on the first optical path 41 to be guided to the third optical path 43, and partially reflects the display image that propagates on the second optical path 42 to be guided to the third optical path 43. Thus, the optical image and the display image are guided to the finder eyepiece unit 17b.

The OVF shutter 38 is a liquid crystal shutter, and is disposed on the first optical path 41. A light transmittance of the OVF shutter 38 is controlled to become a low transmittance (for example, 0%) or a high transmittance (for example, 100%) by the main controller 22. The OVF shutter 38 shields the optical image so as not to be incident onto the prism 37 in a low transmittance area, and transmits the optical image to be incident onto the prism 37 in a high transmittance area. The main controller 22 identifies the respective display areas of the EVFLCD 36, and entirely or partially changes the light transmittance of the OVF shutter 38 according to modes of the finder.

In the case of the EVF mode, the main controller 22 controls the OVF shutter 38 so that areas corresponding to an image display area and an information display area of the EVFLCD 36 are set to a low transmittance. In this case, the entirety of the OVF shutter 38 is set to a low transmittance. The low-transmittance OVF shutter 38 shields an optical image. A captured image is displayed in the image display area of the EVFLCD 36, and an imaging information image and a camera shake information image are displayed in the information display area. Thus, in the EVF mode, the captured image, the imaging information image, and the camera shake information image are observable from the finder eyepiece unit 17b.

In the case of the OVF mode, the main controller 22 controls the OVF shutter 38 so that an area corresponding to an image display area of the EVFLCD 36 is set to a high transmittance and an area corresponding to an information display area thereof is set to a low transmittance. The OVF shutter 38 transmits an optical image in the area corresponding to the image display area, and does not transmit an optical image in the area corresponding to the information display area. The image display area of the EVFLCD 36 is not displayed, and the imaging information image and the camera shake information image are displayed in the information display area.

Figure 4:
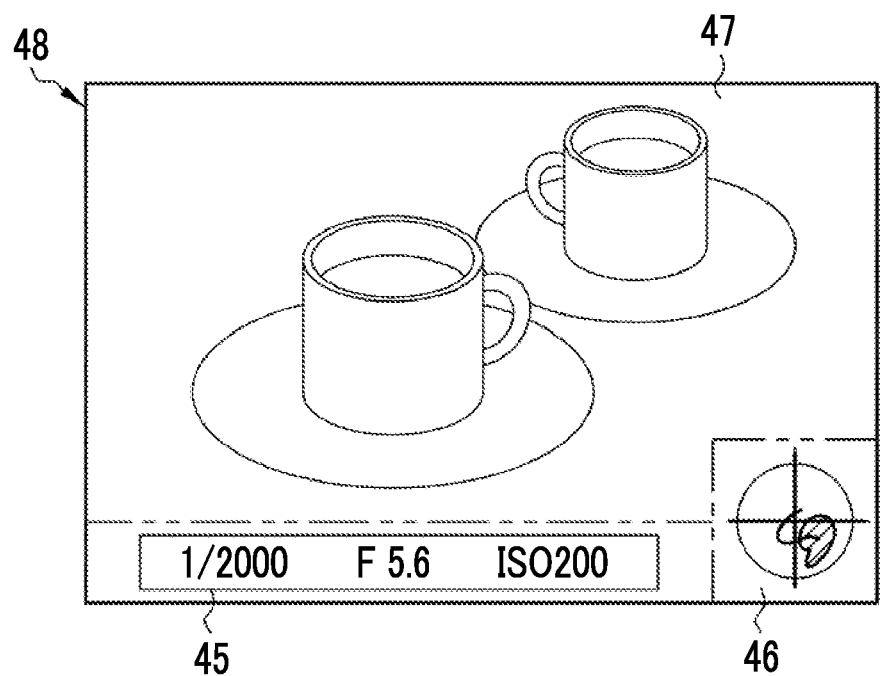
FIG. 4 is a diagram showing an OVF image.

Thus, in the OVF mode, as shown in FIG. 4, an OVF image 48 in which an imaging information image 45 and a camera shake information image 46 displayed on the EVFLCD 36 are overlapped on an optical image 47 is observable from the finder eyepiece unit 17b. The overlapping means partially shielding the optical image 47 and displaying an image or information in a shielded portion. "1/2000" in the imaging information image 45 is a display example of a shutter speed, "ISO 200" is a display example of an ISO sensitivity, and "F5.6" is a display example of a F number.

The camera shake detection unit 29 detects camera shake values that occur in an XY plane direction orthogonal to the optical axis LA of the imaging lens 18 with respect to the digital camera 11. The camera shake values include an angular velocity $\omega_X(t)$ around an X-axis orthogonal to the optical axis LA and an angular velocity $\omega_Y(t)$ around a Y-axis orthogonal to the optical axis LA and the X-axis. The camera shake values $\omega_X(t)$ and $\omega_Y(t)$ represent an X-directional component and a Y-directional component of an angular velocity at a time point t, which are detected by different angular velocity sensors.

The camera shake detection unit 29 detects the camera shake values $\omega_X(t)$ and $\omega_Y(t)$ for each predetermined sample time $\Delta t$. That is, after the camera shake detection unit 29 detects camera shake values $\omega_X(t_n)$ and $\omega_Y(t_n)$ at a certain time point $t_n$, the camera shake detection unit 29 detects camera shake values $\omega_X(t_{n+1})$ and $\omega_Y(t_{n+1})$ at a time point $t_{n+1}(=t_n+\Delta t)$ after one sample time $\Delta t$ elapses.

Figure 5:
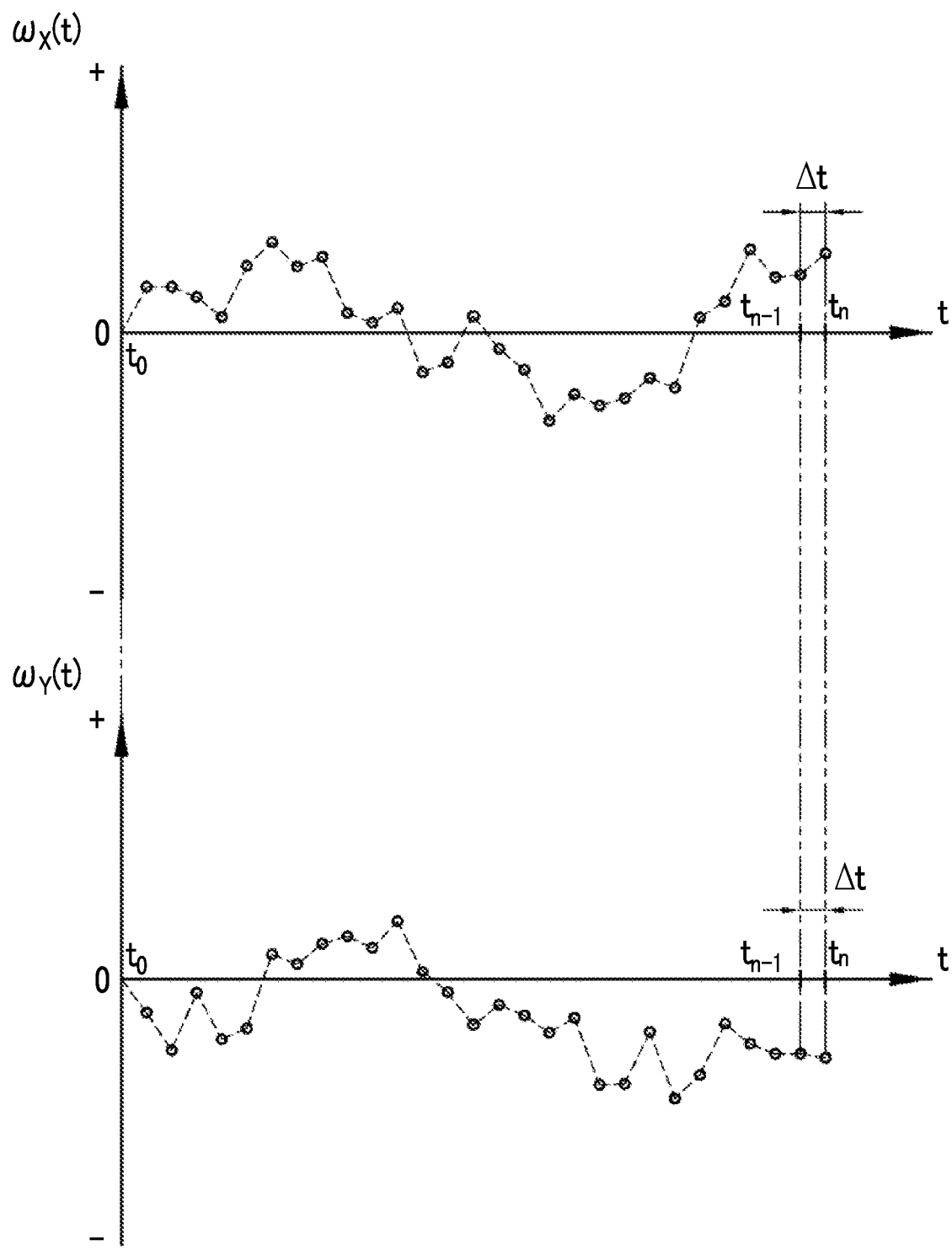
FIG. 5 is a diagram showing an example of camera shake values.

FIG. 5 shows an example of the camera shake values $\omega_X(t)$ and $\omega_Y(t)$ detected by the camera shake detection unit 29 between a camera shake detection starting time point $t_0$ and a current time point $t_n$.

Figure 6:
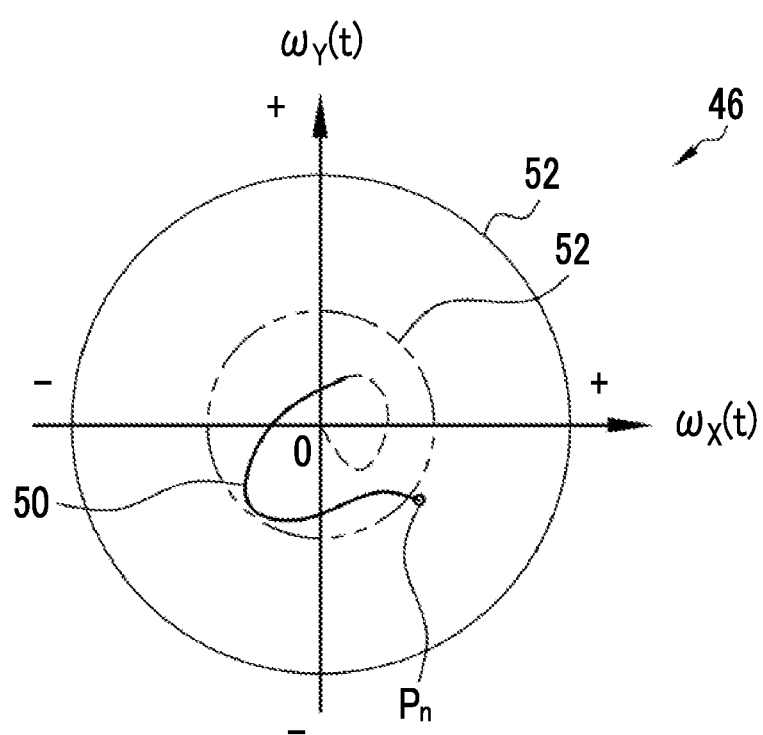
FIG. 6 is a diagram showing a camera shake information image.

The camera shake display controller 30 two-dimensionally plots the camera shake values $\omega_X(t)$ and $\omega_Y(t)$ detected by the camera shake detection unit 29 to generate a camera shake information image 46 shown in FIG. 6 and display the result on the EVFLCD 36. A prediction range (which will be described later) is not shown in FIG. 6.

Since the camera shake display controller 30 plots the camera shake values $\omega_X(t)$ and $\omega_Y(t)$ every sample time $\Delta t$, the camera shake information image 46 is updated every sample time $\Delta t$. As a result, a locus 50 is displayed in the camera shake information image 46. In this embodiment, a leading end of the locus 50 represents the camera shake values $\omega_X(t_n)$ and $\omega_Y(t_n)$ at a current time point (time point $t_n$). This position is referred to as a current position $P_n$.

Further, the camera shake display controller 30 eliminates the plotted respective points after a predetermined time elapses. Thus, portions of the locus 50 after a predetermined time elapses after being plotted are sequentially eliminated.

In addition, the camera shake display controller 30 displays an allowable range 52 of the camera shake values $\omega_X(t)$ and $\omega_Y(t)$ detected by the camera shake detection unit 29. The allowable range 52 is determined by the main controller 22.

Specifically, the main controller 22 is connected to a shake reduction controller 53, and determines the allowable range 52 on the basis of a setting state of a camera shake reducing operation. The main controller 22 has a function as a switch unit that performs switching between turning on and off of the setting state of the camera shake reducing operation. In a case where the camera shake reducing operation is turned on, the imaging lens 18 is moved in a direction opposite to a direction where camera shake occurs. Thus, since shake of an image due to the camera shake is reduced, and thus, the allowable range 52 becomes larger.

In FIG. 6, a case where the camera shake reducing operation is turned on is indicated by a solid line, and a case where the camera shake reducing operation is turned off is indicated by a double-dot chain line. The allowable range 52 may also be changed in accordance with camera shake reducing performance of the shake reduction controller 53 or an imaging condition such as an exposure time.

In this embodiment, the camera shake display controller 30 plots the detected camera shake values $\omega_X(t)$ and $\omega_Y(t)$ whenever one set of camera shake values $\omega_X(t)$ and $\omega_Y(t)$ is obtained by the camera shake detection unit 29, but may plot camera shake values for which time averaging is performed. Thus, a smoothed locus 50 may be displayed.

The camera shake history storage unit 31 stores the camera shake values $\omega_X(t)$ and $\omega_Y(t)$ after operation of the shutter button 14b detected by the camera shake detection unit 29 every sample time $\Delta t$, in the history acquisition mode. Specifically, the camera shake history storage unit 31 stores, as a history, the camera shake values $\omega_X(t)$ and $\omega_Y(t)$ detected by the camera shake detection unit 29 between an operation time point $t_0$ of the shutter button 14b and a time point at which a maximum exposure time $t_b$ capable of being set by the digital camera 11 elapses.

In this embodiment, in order to reduce a variation of camera shake values that occur in an operation of the shutter button 14b from a user, in the history acquisition mode, the user executes the operation of the shutter button 14b a predetermined number of times (N times). The main controller 22 calculates number-of-times average camera shake values $\omega_{XA}(t_m)$ and $\omega_{YA}(t_m)$ indicating average values of N-time camera shake values, on the basis of the following Expressions (1) and (2).

$$\omega_{XA}(t_m) = \frac{1}{N} \sum_{n=1}^{N} \omega_{Xn}(t_m) \quad (1)$$

$$\omega_{YA}(t_m) = \frac{1}{N} \sum_{n=1}^{N} \omega_{Yn}(t_m) \quad (2)$$

Here, $\omega_{Xn}(t_m)$ and $\omega_{Yn}(t_m)$ represent camera shake values after a time $t_m$ elapses from the operation time point $t_0$ of the shutter button 14b in an n-th shutter operation.

The main controller 22 executes computations based on Expressions (1) and (2) between the operation time point $t_0$ of the shutter button 14b and the time point at which the maximum exposure time $t_b$ elapses to calculate number-of-times average camera shake values $\omega_{XA}(t)$ and $\omega_{YA}(t)$ and stores the result in the camera shake history storage unit 31 as a history of the camera shake values.

Figure 7:
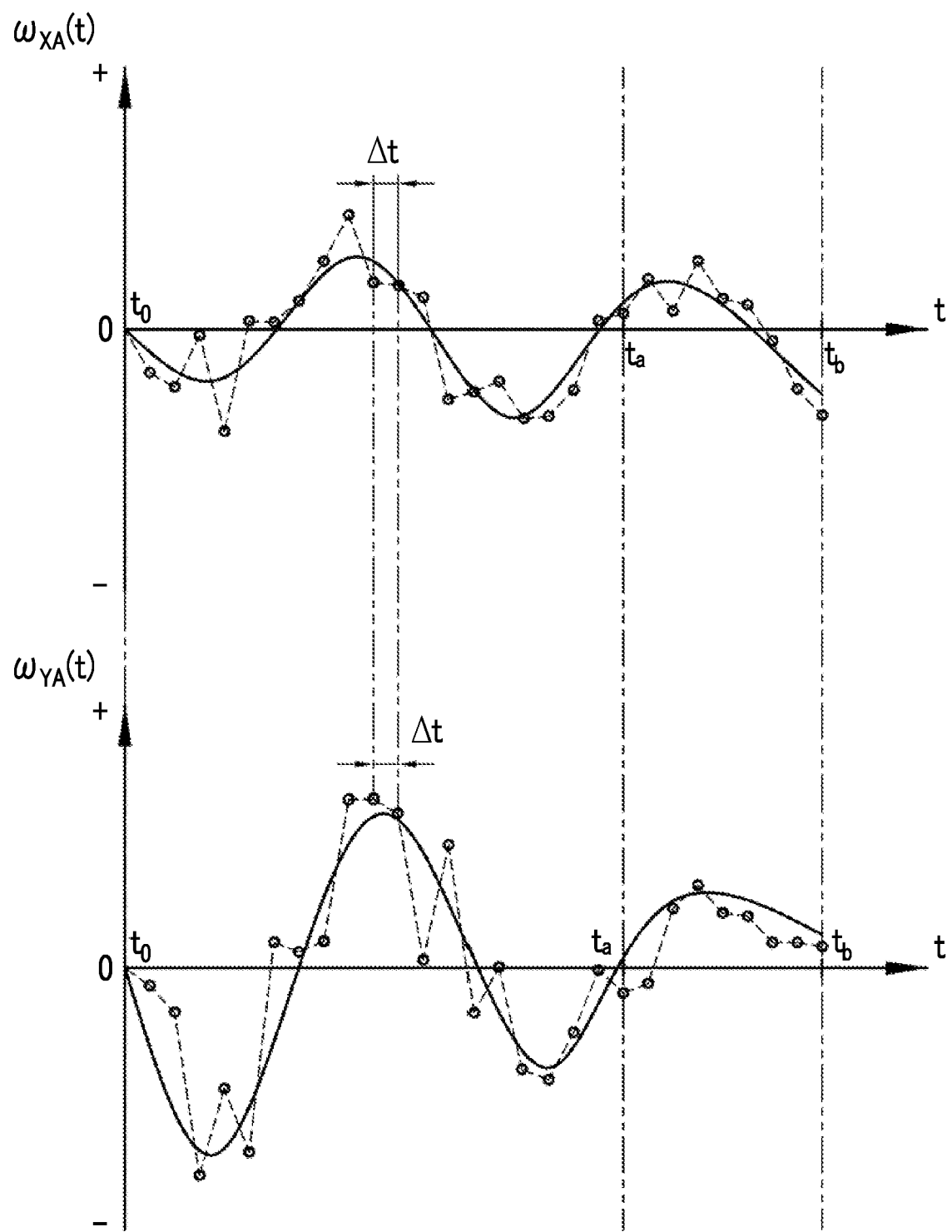
FIG. 7 is a diagram showing an example of number-of-times average camera shake values.

In FIG. 7, a solid line indicates an example of the number-of-times average camera shake values $\omega_{XA}(t)$ and $\omega_{YA}(t)$. A dashed line indicates an example of camera shake values $\omega_{Xn}(t)$ and $\omega_{Yn}(t)$ obtained in one-time operation of the shutter button 14b. The time $t_a$ represents an example of an exposure time set in the digital camera 11.

The prediction range calculation unit 32 calculates a region of camera shake values that occur during the exposure time $t_a$ after the shutter button 14b is operated as a prediction range, on the basis of a history of previous camera shake values stored in the camera shake history storage unit 31. In the calculation of the prediction range, the number-of-times average camera shake values $\omega_{XA}(t)$ and $\omega_{YA}(t)$ obtained between the operation time point $t_0$ of the shutter button 14b and the time point at which the exposure time $t_a$ elapses are used. In a case where setting of the exposure time $t_a$ is changed, the calculation of the prediction range is executed again by the prediction range calculation unit 32, and thus, the prediction range is updated.

Figure 8:
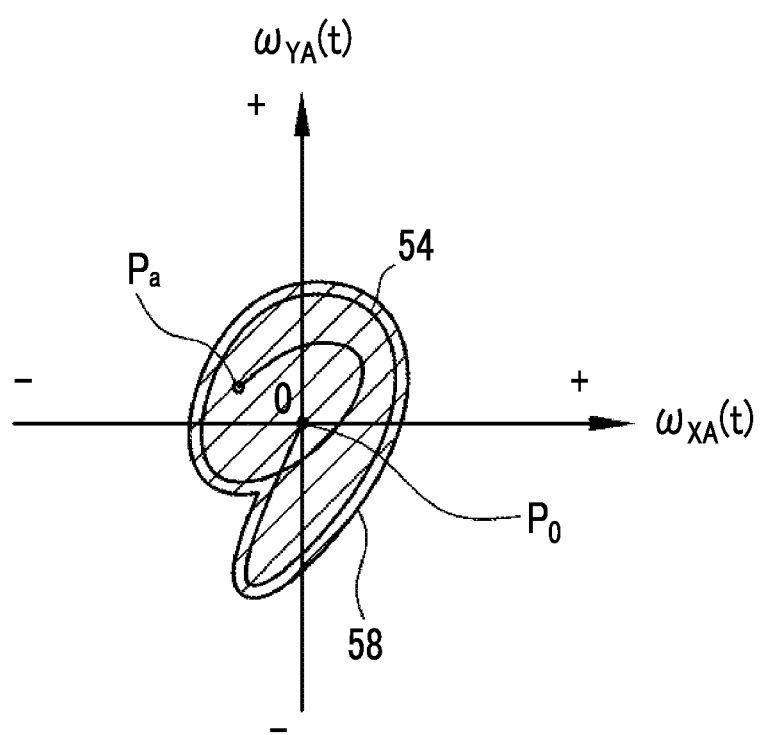
FIG. 8 is a diagram showing a prediction range calculated on the basis of the number-of-times average camera shake values.

FIG. 8 is a diagram in which the number-of-times average camera shake values $\omega_{XA}(t)$ and $\omega_{YA}(t)$ are two-dimensionally plotted between the operation time point $t_0$ of the shutter button 14b and the time point at which the exposure time $t_a$ elapses. A starting point of a history 54 formed by the two-dimensional plotting of the number-of-times average camera shake values $\omega_{XA}(t)$ and $\omega_{YA}(t)$ is an exposure starting position $P_0$ corresponding to the operation time point $t_0$ of the shutter button 14b. An ending point of the history 54 is an exposure ending position $P_a$ corresponding to the time point at which the exposure time $t_a$ elapses.

The prediction range calculation unit 32 calculates a prediction range 58 to surround the history 54. For example, the prediction range calculation unit 32 calculates a point that is most distant from the exposure starting position $P_0$ centering around the exposure starting position $P_0$ in the history 54 illustrated in FIG. 8 over 360° at each predetermined angle, and connects the calculated points to calculate the prediction range 58.

Figure 9:
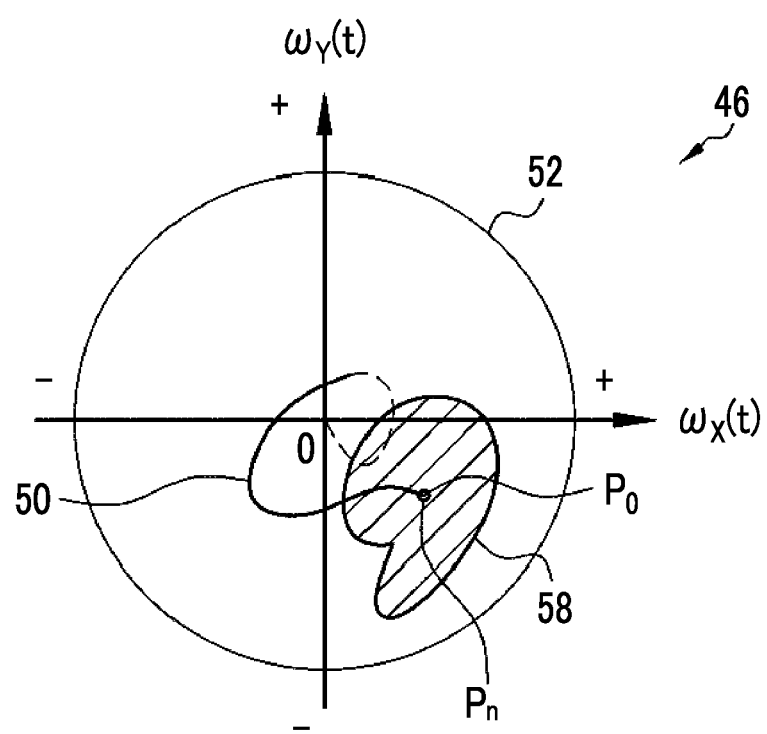
FIG. 9 is a diagram showing a camera shake information image in which the prediction range is displayed.

The camera shake display controller 30 displays the prediction range 58 calculated by the prediction range calculation unit 32 using the leading end of the locus 50 displayed on the camera shake information image 46 as a starting point. Specifically, the camera shake display controller 30 matches the exposure starting position $P_0$ of the prediction range 58 and the leading end (current position $P_n$) of the locus 50 for display to generate the camera shake information image 46 shown in FIG. 9 and display the result on the EVFLCD 36. The camera shake display controller 30 changes the position of the prediction range 58 to match the current position $P_n$ whenever the current position $P_n$ is changed. Thus, it is possible for a user to confirm in advance a range of camera shake that is predicted to occur in a case where the shutter button 14b is actually operated, in addition to a current camera shake state in framing, before an operation of the shutter button 14b.

Figure 10:
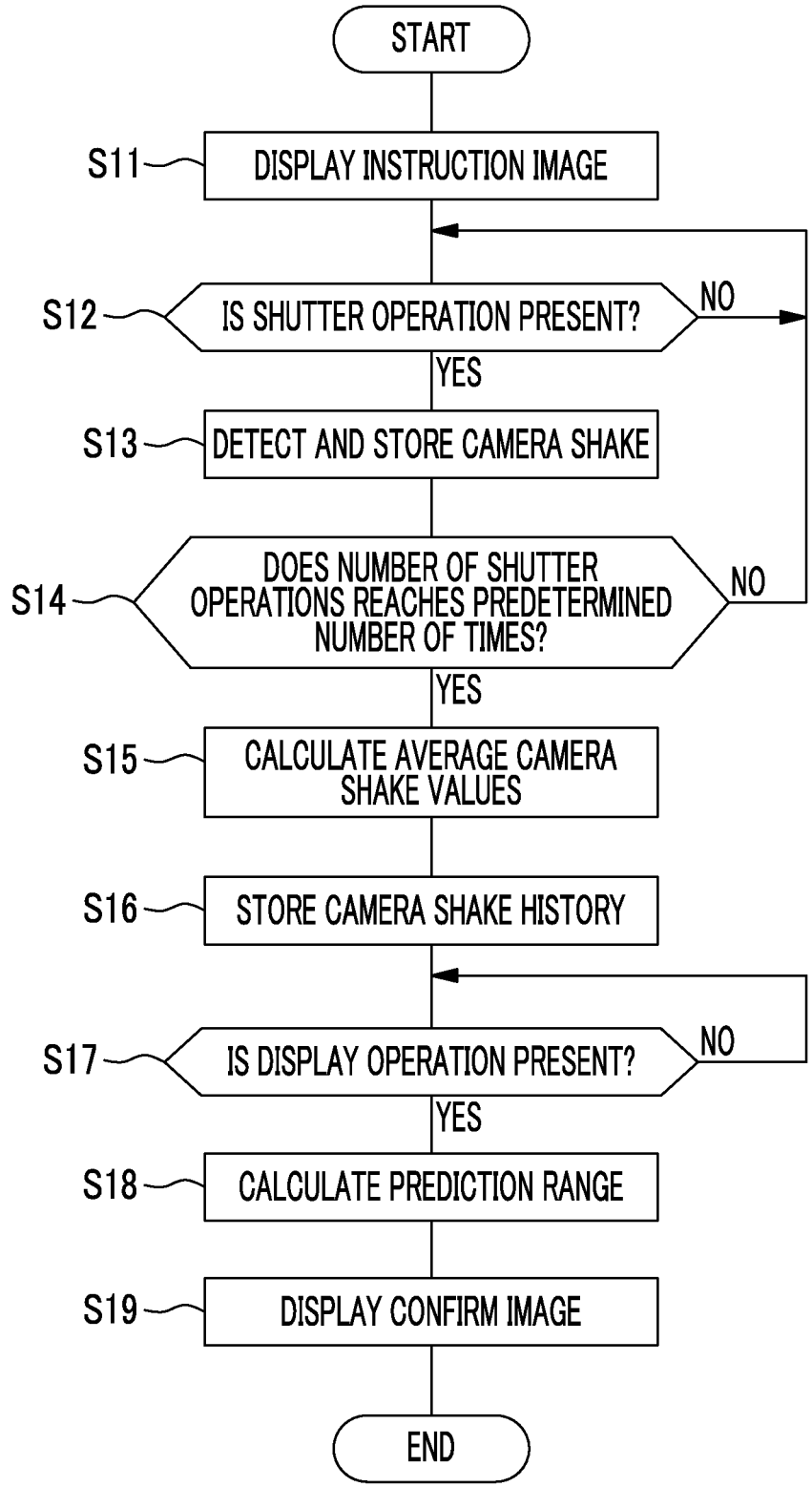
FIG. 10 is a flowchart illustrating a history acquisition mode.
Figure 11:
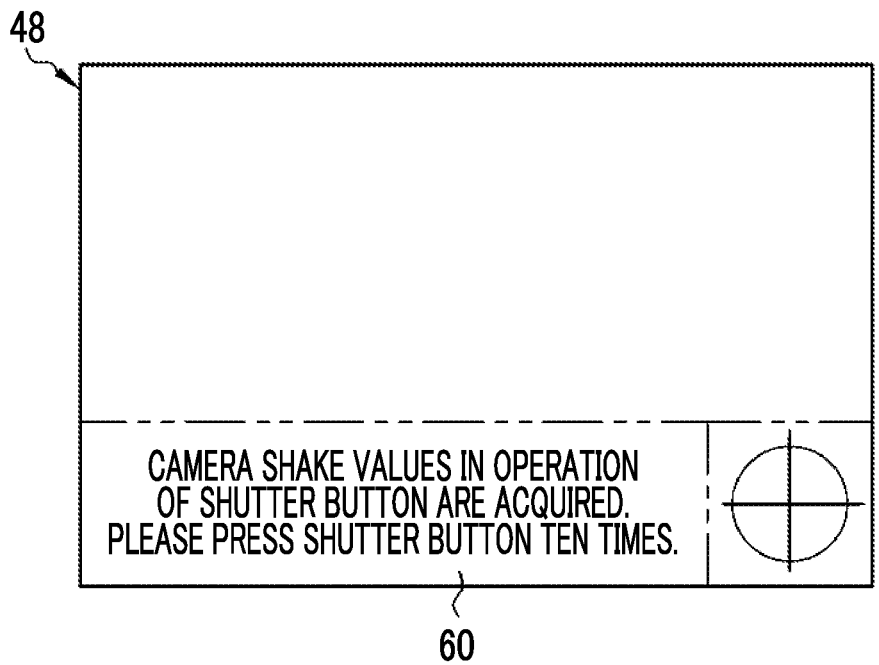
FIG. 11 is a diagram showing an instruction image displayed in the OVF image.

Next, details of the history acquisition mode will be described. As shown in FIG. 10, in a case where the history acquisition mode is executed, the main controller 22 displays an instruction image 60 (see FIG. 11) for instructing a user to perform an operation of the camera shutter button 14b on the EVFLCD 36 (S11). The instruction image 60 is displayed in an information display area of the EVFLCD 36. The instruction image 60 is observable from the finder eyepiece unit 17b as the OVF image 48. In this embodiment, in order to acquire a history (a camera shake habit of each user) of camera shake values in an operation of the shutter button 14b, the instruction image 60 instructs the user to press the shutter button 14b ten times.

In a case where the user presses the shutter button 14b (S12), detection of camera shake is executed by the camera shake detection unit 29, and the camera shake values $\omega_{Xn}(t)$ and $\omega_{Yn}(t)$ detected until the maximum exposure time point $t_b$ are stored in the camera shake history storage unit 31 (S13). Steps S12 and S13 are repeatedly executed until the shutter button 14b is operated ten times (YES in S14).

The main controller 22 counts the number of times n of operations of the shutter button 14b during the display of the instruction image 60. In a case where the shutter button 14b is pressed ten times (in the case of n=10, the main controller 22 calculates the number-of-times average camera shake values $\omega_{XA}(t)$ and $\omega_{YA}(t)$ using the above Expressions (1) and (2)), on the basis of ten-times camera shake values $\omega_{Xn}(t)$ and $\omega_{Yn}(t)$ stored in the camera shake history storage unit 31 (S15). The calculated number-of-times average camera shake values $\omega_{XA}(t)$ and $\omega_{YA}(t)$ are stored in the camera shake history storage unit 31 (S16). Thus, the camera shake values that occur in the operation of the shutter button 14b are stored in the camera shake history storage unit 31.

Figure 12:
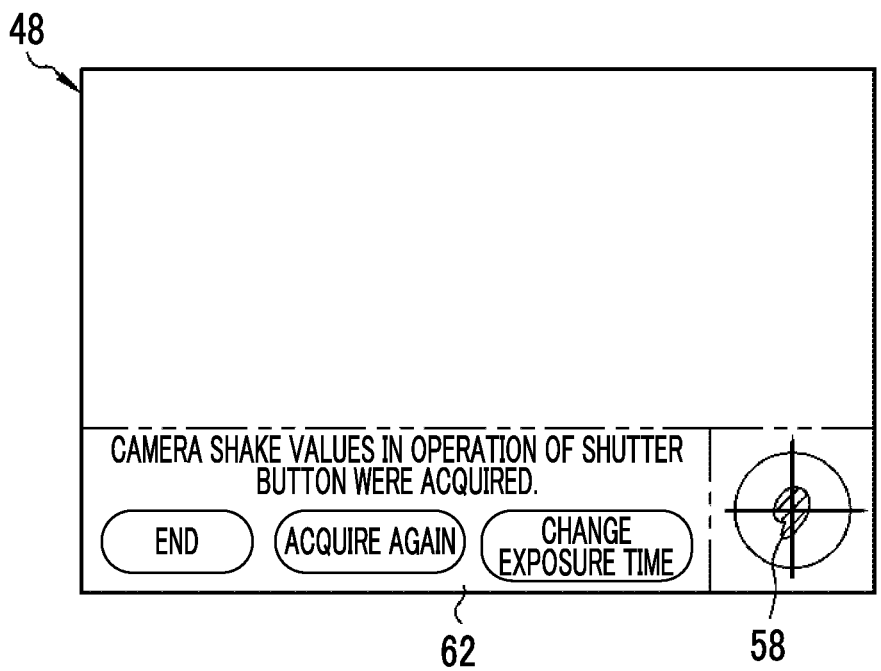
FIG. 12 is a diagram showing a confirmation image displayed in the OVF image.

In the history acquisition mode, in order to allow a user to confirm the history 54 of the camera shake values that occur in the operation of the shutter button 14b, a confirm image 62 shown in FIG. 12 is displayable on the EVFLCD 36 on the basis of an operation of the rear surface operating unit 16. In a case where the user performs a display operation of the confirm image 62 using the rear surface operating unit 16 (YES in S17), the prediction range calculation unit 32 calculates the above-described prediction range 58 on the basis of the number-of-times average camera shake values $\omega_{XA}(t)$ and $\omega_{YA}(t)$ stored in the camera shake history storage unit 31 (S18). The calculation of the prediction range 58 is performed on the basis of a certain specific exposure time $t_a$. The camera shake display controller 30 displays the prediction range 58 calculated by the prediction range calculation unit 32 in the confirm image 62 (S19). The prediction range 58 represents the history 54 of the camera shake values that occur in the operation of the shutter button 14b.

The user may terminate the history acquisition mode or may acquire the history 54 of the camera shake values again, through an operation of the rear surface operating unit 16. Further, the user may change the exposure time $t_a$ and may confirm the history 54 of the camera shake values every exposure time $t_a$, through an operation of the rear surface operating unit 16. In a case where the exposure time ta is changed, the prediction range calculation unit 32 calculates the prediction range 58 corresponding to the changed exposure time $t_a$. The camera shake display controller 30 displays the calculated prediction range 58 in the confirm image 62.

The history 54 stored in the camera shake history storage unit 31 in the history acquisition mode may be reset by the main controller 22 on the basis of an operation of the rear surface operating unit 16 from the user.

An operation of the digital camera 11 having such a configuration will be described. The digital camera 11 is configured so that a user can operate the power button 14a, select a static image capturing mode as an operation mode, and select a mode of the finder. In a case where the mode of the finder is set to the OVF mode, camera shake detection is started, and the locus 50 of camera shake that currently occurs is displayed on the EVFLCD 36. At the leading end (current position $P_n$) of the locus 50, the prediction range 58 of camera shake values that are predicted to occur in an operation of the shutter button 14b is displayed on the basis of the history 54 of camera shake values acquired in advance in the history acquisition mode.

It is usual that camera shake values in framing and camera shake values that occur in an operation of the shutter button 14b are quite different from each other. The camera shake values that occur in the operation of the shutter button 14b is larger than the camera shake values in framing, and have nothing to do with the camera shake values in framing. In this embodiment, the camera shake values that occur in the operation of the shutter button 14b are accurately predicted on the basis of the history 54 of the camera shake values, and its prediction range is displayed together with the locus 50 of the camera shake that currently occur. Thus, the user may pay attention to the state in advance so as to reduce camera shake in the operation of the shutter button 14b.

The camera shake display controller 30 may display an image indicating a warning in a case where the leading end of the locus 50 moves out of the allowable range 52. Further, the camera shake display controller 30 may display an image indicating a warning in a case where a part or the entirety of the prediction range 58 moves out of the allowable range 52.

The above-described camera shake information display may be executed even in the EVF mode. In the EVF mode, in a case where the camera shake reducing operation is turned on, a captured image in which camera shake reduction is performed can be confirmed. However, in the OVF mode, a captured image in which camera shake reduction is performed cannot be performed. Thus, the above-described camera shake information display may be particularly useful in the OVF mode.

Second Embodiment

In the first embodiment, in the history acquisition mode, in order to reduce a variation of camera shake values in an operation of the shutter button 14b, the number-of-times average camera shake values $\omega_{XA}(t)$ and $\omega_{YA}(t)$ obtained by averaging the camera shake values $\omega_{Xn}(t)$ and $\omega_{Yn}(t)$ obtained by a one-time operation of the shutter button 14b a predetermined number of times are calculated. In a second embodiment, in addition to the number-of-times averaging, by performing time averaging, a variation of camera shake values in an operation of the shutter button 14b is reduced. In the second embodiment, by performing the time averaging, even in a case where the number of operations of the shutter button 14b in the history acquisition mode is small, it is possible to reduce a variation of camera shake values.

In this embodiment, the main controller 22 performs time averaging with respect to the number-of-times average camera shake values $\omega_{XA}(t)$ and $\omega_{YA}(t)$ acquired in the history acquisition mode on the basis of the following Expressions (3) and (4), to calculate time average camera shake values $\omega_{XB}(t)$ and $\omega_{YB}(t)$.

$$\omega_{XB}(t_m) = \frac{1}{p+1} \sum_{q=m-p}^{m} \omega_{XA}(t_q) \quad (3)$$

-continued $$\omega_{YB}(t_m) = \frac{1}{p+1} \sum_{q=m-p}^{m} \omega_{YA}(t_q) \quad (4)$$

Figure 13:
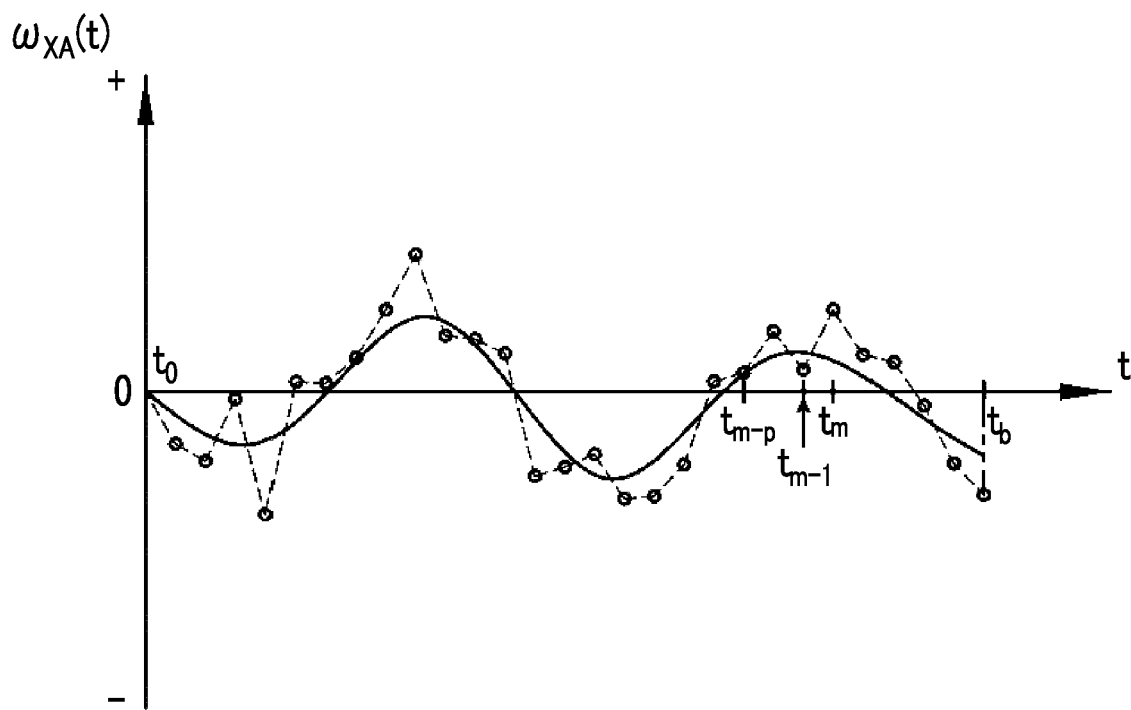
FIG. 13 is a diagram showing an example of time average camera shake values.

FIG. 13 shows an example of the time average camera shake values $\omega_{XB}(t)$ and $\omega_{YB}(t)$ obtained by applying Expressions (3) and (4) to the above-described number-of-times average camera shake values $\omega_{XA}(t)$ and $\omega_{YA}(t)$.

In this embodiment, the time average camera shake values $\omega_{XB}(t)$ and $\omega_{YB}(t)$ are stored in the camera shake history storage unit 31 as the history 54, and the prediction range 58 is calculated by the prediction range calculation unit 32. The parameter p indicating a period of the time averaging may be appropriately changed. For example, "p=3" is set.

Further, on the basis of the following Expressions (5) and (6), standard deviations $\sigma_X(t)$ and $\sigma_Y(t)$ indicating variations of the number-of-times average camera shake values $\omega_{XA}(t)$ and $\omega_{YA}(t)$ may be reflected into the history.

$$\sigma_X(t_m) = \sqrt{\frac{\sum_{q=m-p}^{m}(\omega_X(t_q) - \omega_{XA}(t_q))^2}{p}} \quad (5)$$

$$\sigma_Y(t_m) = \sqrt{\frac{\sum_{q=m-p}^{m}(\omega_Y(t_q) - \omega_{YA}(t_q))^2}{p}} \quad (6)$$

Figure 14:
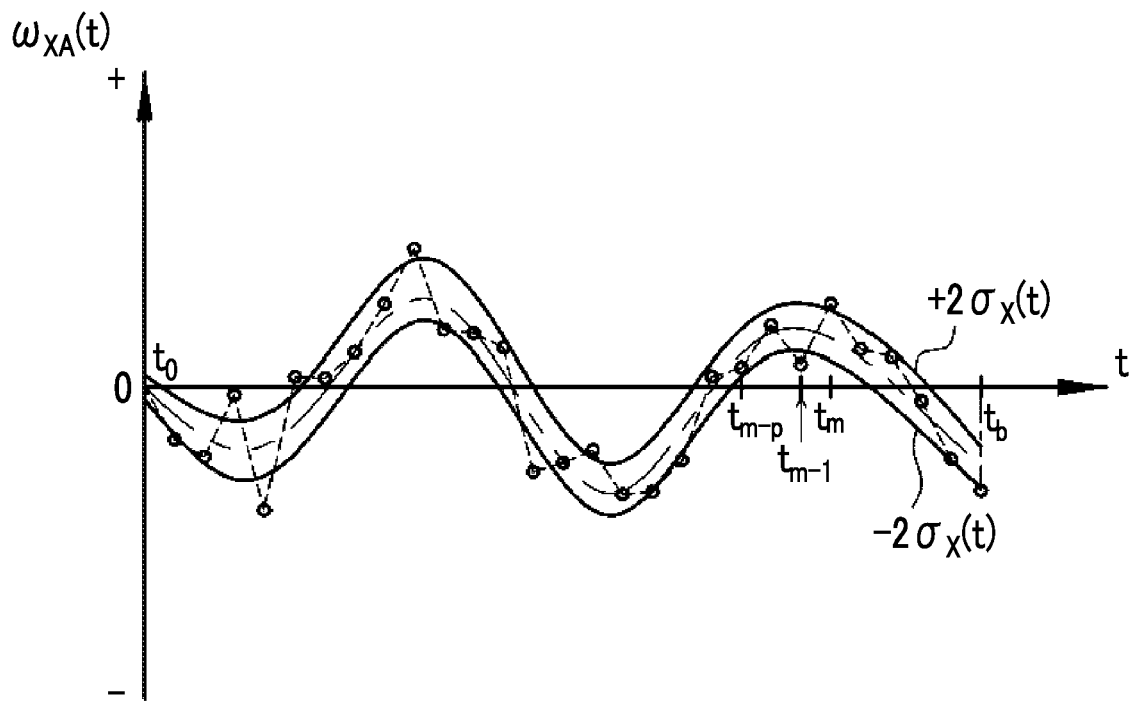
FIG. 14 is a diagram showing a history of camera shake values in consideration of a standard deviation.

FIG. 14 shows an example of a region of "$\omega_{XB}(t) \pm 2\sigma_X(t)$" calculated by Expression (5).

In this embodiment, the camera shake history storage unit 31 stores ranges of "$\omega_{XB}(t) \pm 2\sigma_X(t)$" and "$\omega_{YB}(t) \pm 2\sigma_Y(t)$" as a history 64. The prediction range calculation unit 32 calculates a prediction range 66 on the basis of the history 64 stored in the camera shake history storage unit 31.

Figure 15:
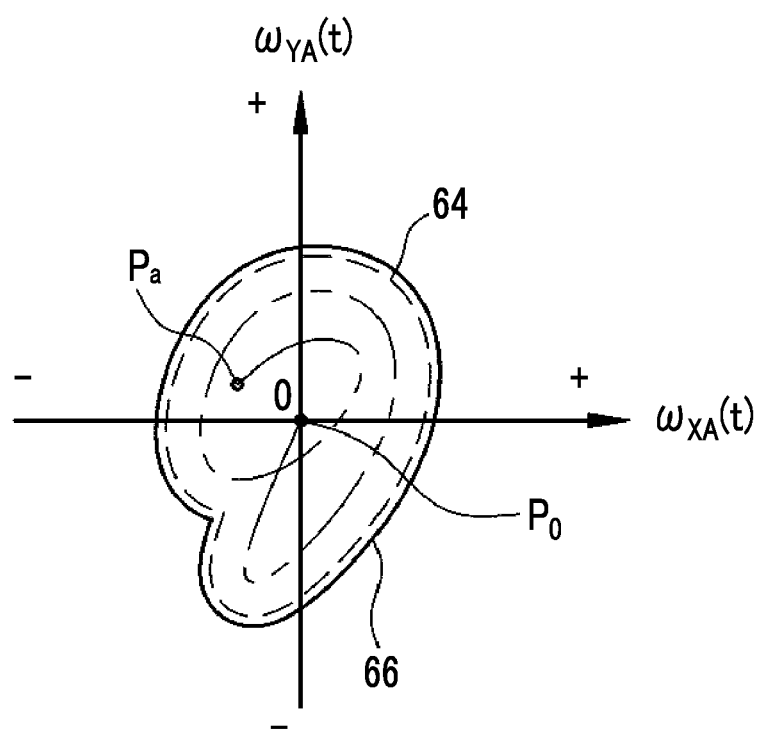
FIG. 15 is a diagram showing a prediction range calculated on the basis of a standard deviation.

FIG. 15 shows an example of the prediction range 66. The prediction range 66 is set to be larger than the above-described prediction range 58 by such a range that the standard deviations $\sigma_X(t)$ and $\sigma_Y(t)$ are reflected in the history 64. In this embodiment, the ranges of "$\omega_{XB}(t) \pm 2\sigma_X(t)$", "$\omega_{YB}(t) \pm 2\sigma_Y(t)$" are used as the history 64, but generally, ranges of "$\omega_{XB}(t) \pm s \times \sigma_X(t)$", "$\omega_{YB}(t) \pm s \times \sigma_Y(t)$" may be used as the history 64 using a coefficient s.

Further, in the first and second embodiments, in order to acquire a history of camera shake values in an operation of the shutter button 14b, the history acquisition mode is provided, but the history of the camera shake values may be calculated from the camera shake values $\omega_X(t)$ and $\omega_Y(t)$ in the operation of the shutter button 14b in real imaging. In this case, since it is not possible to perform the number-of-time averaging based on Expressions (1) and (2), it is preferable to perform time averaging based on Expressions (1) and (2). In addition, it is also preferable to consider the standard deviations $\sigma_X(t)$ and $\sigma_Y(t)$ calculated by Expressions (5) and (6).

Third Embodiment

In the first and second embodiments, the prediction ranges 58 and 66 are matched with the current position $P_n$ indicating the current camera shake values $\omega_X(t_n)$ and $\omega_Y(t_n)$ for display. However, there is a time lag until the shutter button 14b is actually pressed by a user, and thus, there is a possibility that the leading end of the locus 50 moves due to camera shake during the time lag. In the third embodiment, camera shake values that occur after a predetermined time elapses from a current time point (time point $t_n$) are predicted, the prediction range 58 is matched with the position of the predicted camera shake values for display.

Figure 16:
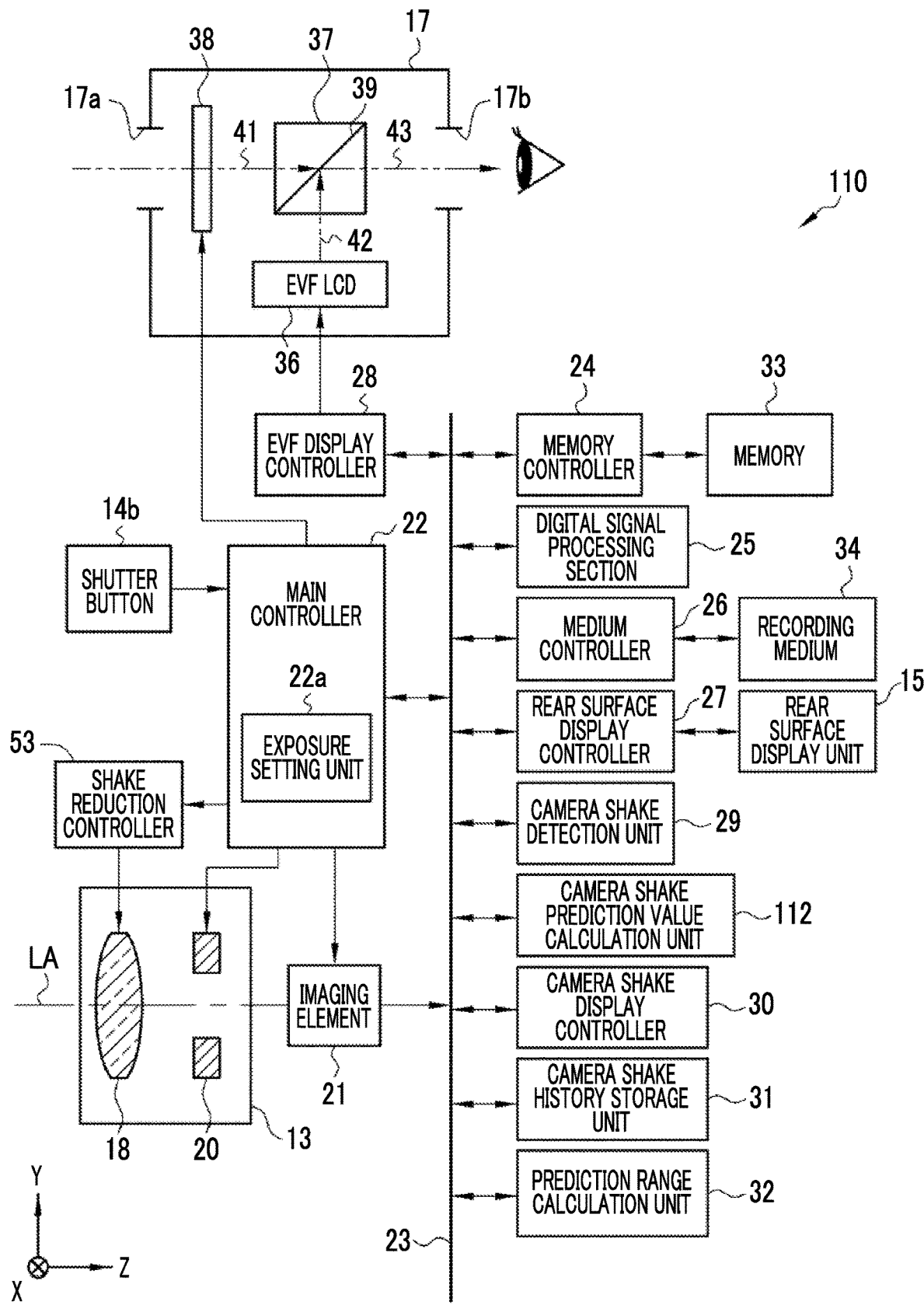
FIG. 16 is a block diagram showing an electric configuration of a digital camera according to a third embodiment.

In this embodiment, as shown in FIG. 16, a camera shake prediction value calculation unit 112 is provided in a digital camera 110, in addition to the respective units of the digital camera 11 in the first embodiment.

The camera shake prediction value calculation unit 112 calculates camera shake prediction values indicating camera shake values after a predetermined time elapses from a current time point $t_n$ by computation. Camera shake prediction values $\omega_X(t_{n+1})$ and $\omega_Y(t_{n+1})$ that are predicted to occur at a time point $t_{n+1}$ after one sample time $\Delta t$ elapses from the current time point $t_n$ are calculated by the following Expressions (7) to (12) based on a Runge-Kutta method, for example.

$$\omega_X(t_{n+1}) = \omega'_X(t_n)\Delta t + \frac{1}{2}\omega''_X(t_n)\Delta t^2 + \omega_X(t_n) \quad (7)$$

$$\omega'_X(t_n) = \frac{\omega_X(t_n) - \omega_X(t_{n-1})}{\Delta t} \quad (8)$$

$$\omega''_X(t_n) = \frac{\omega'_X(t_n) - \omega'_X(t_{n-1})}{\Delta t} \quad (9)$$

$$\omega_Y(t_{n+1}) = \omega'_Y(t_n)\Delta t + \frac{1}{2}\omega''_Y(t_n)\Delta t^2 + \omega_Y(t_n) \quad (10)$$

$$\omega'_Y(t_n) = \frac{\omega_Y(t_n) - \omega_Y(t_{n-1})}{\Delta t} \quad (11)$$

$$\omega''_Y(t_n) = \frac{\omega'_Y(t_n) - \omega'_Y(t_{n-1})}{\Delta t} \quad (12)$$

The camera shake display controller 30 repeats the computation based on Expressions (7) to (12) a predetermined number of times (M times), to calculate camera shake prediction values $\omega_X(t_{n+m})$ and $\omega_Y(t_{n+m})$ after M sample times $\Delta t$. M may be appropriately set in consideration of the time lag.

Figure 17:
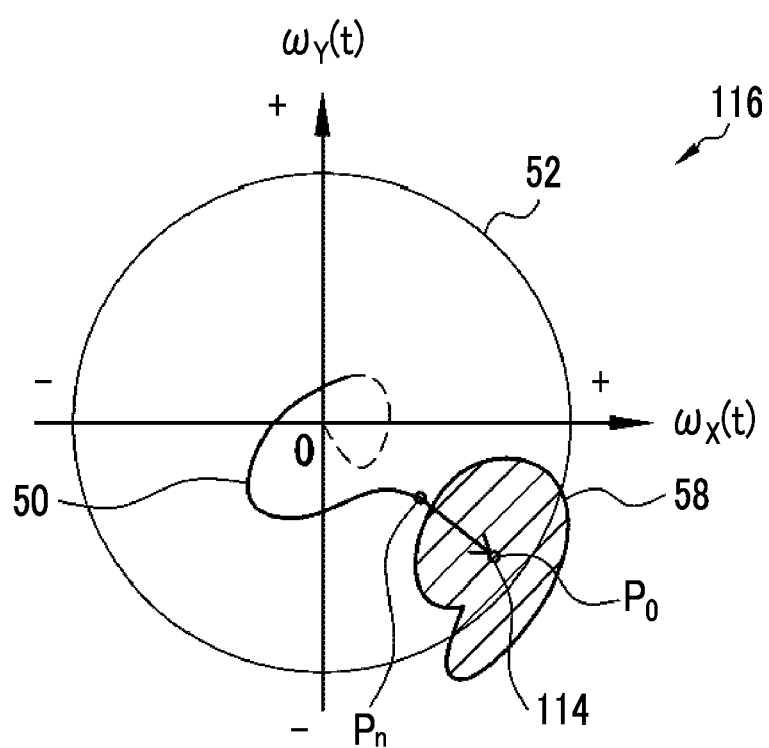
FIG. 17 is a diagram showing a modification example of the camera shake information image.

As shown in FIG. 17, the camera shake display controller 30 plots a position 114 (camera shake prediction position) corresponding to the camera shake prediction values $\omega_X(t_{n+m})$ and $\omega_Y(t_{n+M})$ calculated by the camera shake prediction value calculation unit 112, and displays the camera shake prediction position 114 to match an exposure starting position $P_0$ of the prediction range 58 calculated by the prediction range calculation unit 32. Thus, a camera shake information image 116 is generated and is displayed on the EVFLCD 36.

The camera shake display controller 30 may display an image indicating a warning in a case where the camera shake prediction position 114 moves out of the allowable range 52.

In the third embodiment, the Runge-Kutta method is used as the computation method of the camera shake prediction position 114, but the invention is not limited thereto, and instead, a least squares method, a high-order regression line calculation, or the like may be used.

Fourth Embodiment

Figure 18:
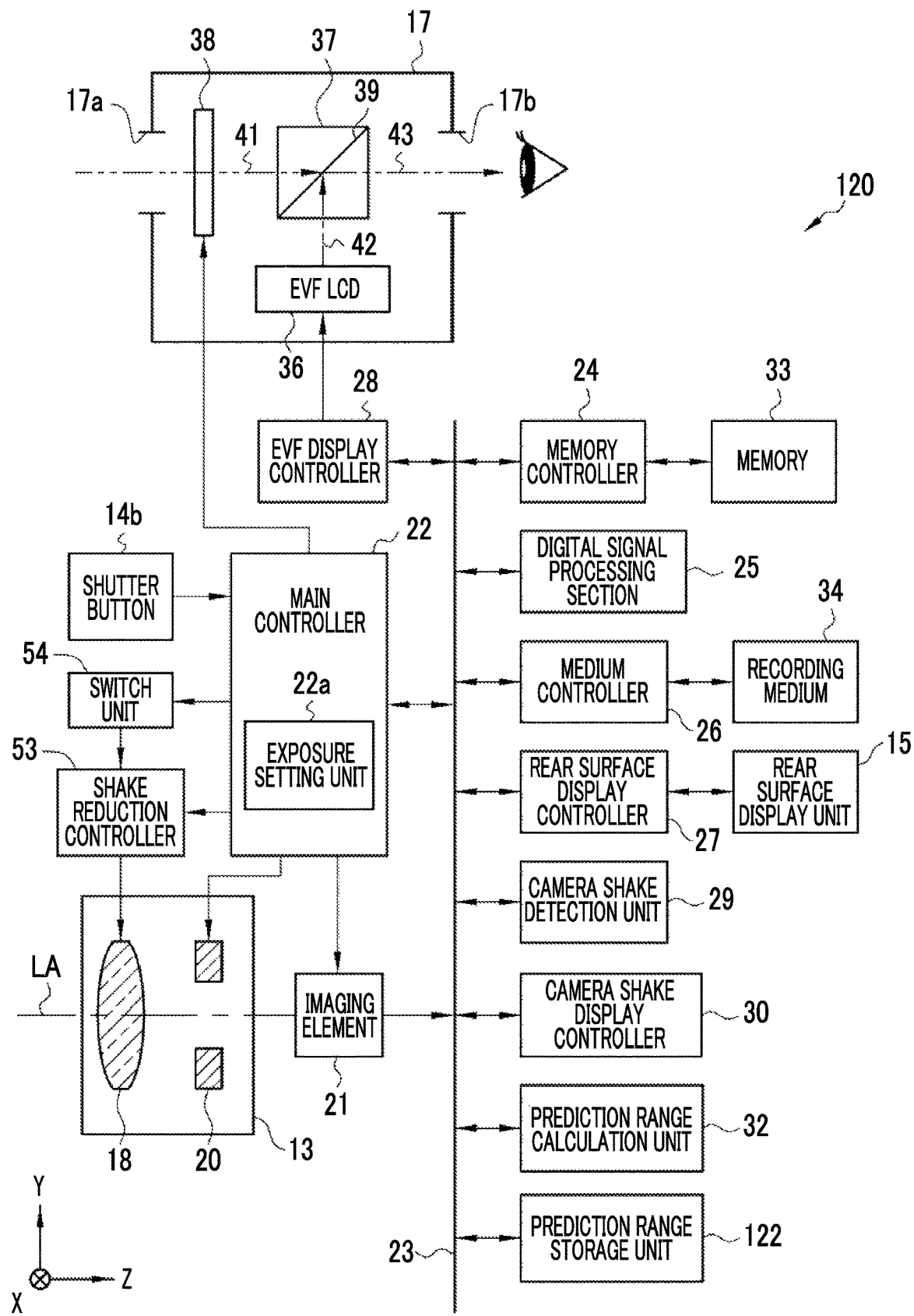
FIG. 18 is a block diagram showing an electric configuration of a digital camera according to a fourth embodiment.

In the first to third embodiments, a history of camera shake values in an operation of the shutter button 14b acquired in the history acquisition mode is stored in the camera shake history storage unit 31, and whenever setting of am exposure time $t_a$ is changed, calculation of a prediction range is performed by the prediction range calculation unit 32. In a fourth embodiment, in the history acquisition mode, prediction ranges of camera shake values are calculated with respect to a plurality of exposure times $t_a$. In the fourth embodiment, as shown in FIG. 18, in a digital camera 120, a prediction range storage unit 122 is provided, instead of the camera shake history storage unit 31.

The prediction range calculation unit 32 has a function of temporarily storing the above-described number-of-times average camera shake values $\omega_{XA}(t)$ and $\omega_{YA}(t)$ in the history acquisition mode. Acquisition of the number-of-times average camera shake values $\omega_{XA}(t)$ and $\omega_{YA}(t)$ is performed in the same way as in the first embodiment. The prediction range calculation unit 32 calculates prediction ranges using the same method as in the above description with respect to the plurality of exposure times $t_a$, on the basis of the number-of-times average camera shake values $\omega_{XA}(t)$ and $\omega_{YA}(t)$.

The prediction range storage unit 122 stores the prediction ranges calculated with respect to the plurality of exposure times $t_a$ by the prediction range calculation unit 32, in correspondence with the exposure times $t_a$.

The camera shake display controller 30 acquires and displays a prediction range corresponding to an exposure time $t_a$ that is currently set from the plurality of prediction ranges stored in the prediction range storage unit 122. According to this embodiment, since a plurality of prediction ranges are calculated in advance, it is possible to generate a camera shake information image at high speed.

In the respective embodiments, the prediction range calculation unit 32 calculates the prediction range 58 or 66 to surround the history 54 or 64, but the shape of the prediction range is not limited thereto, and for example, as shown in FIG. 19, a circular form may be used.

In the respective embodiments, a camera shake reducing operation is executed using a lens shift method for moving the imaging lens 18, but instead, a sensor shift method for moving the imaging element 21 may be employed. In the case of the EVF mode, or in a case where a captured image is displayed on the rear surface display unit 15, shake of the captured image may be reduced by image processing.

In the respective embodiments, the camera shake detection unit 29 respectively detects angular velocities that occur around the X-axis and the Y-axis using two angular velocity sensors, but instead, or in addition, an acceleration that occurs in a translation direction of the X-axis and an acceleration that occurs in a translation direction of the Y-axis may be respectively detected using different acceleration sensors. Further, using one additional angular velocity sensor, an angular velocity that occurs around the optical axis LA may be detected.

In the respective embodiments, the camera shake information image 46 or 116 is displayed on the EVFLCD 36, but instead, may be displayed on the rear surface display unit 15. In this case, the rear surface display unit 15 corresponds to an image display unit disclosed in claims.

Further, a configuration in which a history of camera shake values is acquired for each imaging mode or each user and is stored in the camera shake history storage unit 31 and the history of the camera shake values is read out from the camera shake history storage unit 31 in accordance with a corresponding imaging mode or user to calculate a prediction range may be employed. For example, for each imaging scene, the presence or absence of tripod connection, a user ID, or a mode of the finder, a history of camera shake values may be acquired. In addition, a configuration in which a sensor that detects a posture of a digital camera is provided and a history of camera shake values is acquired for each posture (longitudinal or lateral) of the digital camera may be employed.

In the above-described embodiments, the camera shake display controller 30 and the prediction range calculation unit 32 are provided separately from the main controller 22, but the camera shake display controller 30 and the prediction range calculation unit 32 may be provided in the main controller 22. In this case, the main controller 22 may have functions as the camera shake display controller 30 and the prediction range calculation unit 32.

Further, a configuration in which the respective functions of the camera shake display controller 30 and the prediction range calculation unit 32 are stored in a ROM as a program and the respective functions are executed by the main controller 22 on the basis of the program may be employed.

In addition, the invention may be applied to either an integration type imaging apparatus in which a lens barrel and a camera body are integrated or a lens exchange type imaging apparatus in which a lens barrel and a camera body are detachable from each other. In the lens exchange type imaging apparatus, in a case where a shake reduction controller is provided in the lens barrel, it is preferable to change the size of the above-described allowable range in accordance with camera shake reduction performance of the shake reduction controller.

Furthermore, the invention is not limited to the digital camera, and may be applied to an imaging apparatus of a digital video camera, a mobile phone, a smartphone, or a tablet terminal, for example.

EXPLANATION OF REFERENCES 11, 110, 120: digital camera
14b: shutter button (shutter operating unit)
15: rear surface display unit (image display unit)
17: finder device (finder unit)
21: imaging element
22: main controller (switch unit)
22a: exposure setting unit (exposure time setting unit)
29: camera shake detection unit
30: camera shake display controller
32: prediction range calculation unit
36: EVFLCD (image display unit)
53: shake reduction controller
112: camera shake prediction value calculation unit

What is claimed is:
1. An imaging apparatus comprising:
a camera shake detection unit that detects a camera shake value;
a shutter operating unit that is operated in imaging;
an image display unit on which an image is displayed;
a prediction range calculation unit that calculates a prediction range of a camera shake value that occurs in a case where the shutter operating unit is operated, on the basis of a history of the camera shake value after a previous operation of the shutter operating unit; and
a camera shake display controller that displays a locus of camera shake on the image display unit on the basis of the camera shake value detected by the camera shake detection unit before the operation of the shutter operating unit and displays the prediction range on the image display unit using a leading end of the locus as a starting point.

2. The imaging apparatus according to claim 1,
wherein the camera shake detection unit detects the camera shake values that occur in an in-plane direction orthogonal to an optical axis of an imaging lens.

3. The imaging apparatus according to claim 2, further comprising:
an imaging element that generates an image on the basis of an optical image that is incident through the imaging lens; and
an exposure time setting unit that sets an exposure time of the imaging element,
wherein the prediction range calculation unit calculates a prediction range of a camera shake value in the in-plane direction that occurs in the exposure time set by the exposure time setting unit after the shutter operating unit is operated, on the basis of the history of the camera shake value.

4. The imaging apparatus according to claim 3,
wherein the prediction range calculation unit calculates the prediction range as a range including the locus in the exposure time set by the exposure time setting unit on the basis of the history of the camera shake value.

5. The imaging apparatus according to claim 3,
wherein the camera shake display controller displays an allowable range of the camera shake value on the basis of an imaging condition including the exposure time.

6. The imaging apparatus according to claim 5, further comprising:
a shake reduction controller that moves the imaging lens or the imaging element on the basis of the camera shake value detected by the camera shake detection unit to reduce shake of the image due to camera shake; and
a switch unit that switches a shake reducing operation of the shake reduction controller between turning on and off.

7. The imaging apparatus according to claim 6,
wherein the camera shake display controller displays the allowable range on the basis of a setting state of the shake reducing operation through the switch unit, in addition to the imaging condition.

8. The imaging apparatus according to claim 1,
wherein the camera shake display controller sequentially eliminates portions of the locus after a predetermined time elapses.

9. The imaging apparatus according to claim 1, further comprising:
a camera shake prediction value calculation unit that calculates a camera shake prediction value indicating a camera shake value after a predetermined time elapses from the locus by computation,
wherein the camera shake display controller displays the prediction range using the camera shake prediction value calculated by the camera shake prediction value calculation unit as a starting point.

10. The imaging apparatus according to claim 1,
wherein a history acquisition mode for acquiring the history of the camera shake values is provided,
wherein in the history acquisition mode, the shutter operating unit is operable a predetermined number of times, and
wherein the camera shake display controller calculates the prediction range on the basis of the camera shake value after the predetermined number of operations of the shutter operating unit, and displays the calculated prediction range on the image display unit.

11. The imaging apparatus according to claim 1, further comprising:
a finder unit configured to observe an optical image,
wherein the image display unit displays the locus in the finder unit, and displays the prediction range.

12. The imaging apparatus according to claim 1,
wherein the image display unit is a rear surface display unit.

13. A control method of an imaging apparatus including a camera shake detection unit that detects a camera shake value, a shutter operating unit that is operated in imaging, and an image display unit on which an image is displayed, the method comprising:
a prediction range calculation step of calculating a prediction range of a camera shake value that occurs in a case where the shutter operating unit is operated, on the basis of a history of the camera shake value after a previous operation of the shutter operating unit; and
a camera shake display control step of displaying a locus of camera shake on the image display unit on the basis of the camera shake value detected by the camera shake detection unit before the operation of the shutter operating unit and displaying the prediction range on the image display unit using a leading end of the locus as a starting point.

* * * * *